E. W. MARSHALL.
CABLE CLAMP.
APPLICATION FILED SEPT. 13, 1912.
1,060,006.
Patented Apr. 29, 1913.
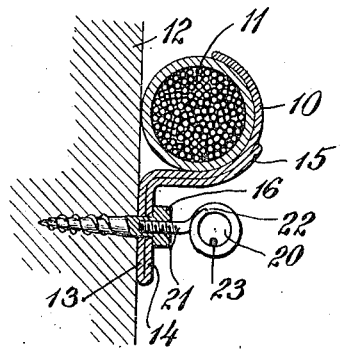
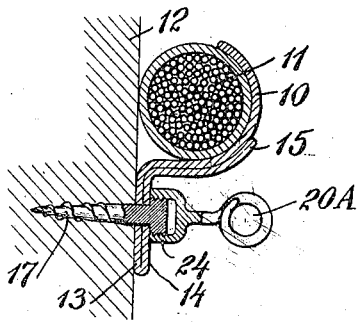
WITNESSES
INVENTOR
Ernest W. Marshall

UNITED STATES PATENT OFFICE.

ERNEST W. MARSHALL, OF YONKERS, NEW YORK, ASSIGNOR TO J. EDWARD OGDEN, OF BROOKLYN, NEW YORK.

CABLE-CLAMP.

1,060,006. Specification of Letters Patent. Patented Apr. 29, 1913.

Application filed September 18, 1912. Serial No. 720,130.

*To all whom it may concern:*

Be it known that I, ERNEST W. MARSHALL, a citizen of the United States, and a resident of the city of Yonkers, county of Westchester, and State of New York, have invented certain new and useful Improvements in Cable-Clamps, of which the following is a specification, reference being had to the accompanying drawings, forming a part thereof.

My invention relates to devices such as are used for supporting electric cables or the like along the faces of walls, ceilings or other structures and its object is to provide such a device which is so constructed that a bridle-ring or support for other wires may be combined therewith in some such manner as those shown in the accompanying drawings which I will proceed to describe in the following specification and the novel features of which I will set forth in appended claims.

Referring to the drawings, Figure 1 is a sectional side elevation of a cable clamp embodying my invention, showing a cable in cross-section held thereby and with a bridle ring shown in elevation. In Fig. 2 a cable and clamp are shown in similar view, with a part of the bridle ring shown in section. This figure illustrates a modified form of construction.

Like characters of reference designate corresponding parts in all of the figures.

As illustrated in Figs. 1, 2 and 3, the hanger comprises a clamping member formed of a sheet metal strip bent to form a hook-like portion 10 which is adapted to partially surround a cable 11 and to hold it against a wall 12. One end of this curved portion of the clamp is carried back to the wall where it is bent at right angles to form the base 13 which is adapted to rest upon the wall. Then if desired, the metal may be bent back upon itself to form the portions 14 and 15 which reinforce the base 13 and a part of the curved hook 10 respectively.

A hole is punched or drilled through the parts 13 and 14 through which a holding member may pass by means of which the clamp is secured to the wall. In Fig. 1 this holding member is a lag-screw 16, the head of which is drilled and tapped to receive the threaded shank 21 of a bridle ring 20. This is an ordinary ring, open at 22 so that wires such as 23 may be inserted therein.

In the arrangement shown in Fig. 2 a screw 17 is used to affix the clamp to the wall. The head of this screw is threaded and the shank of the bridle-ring 20ᴬ is enlarged as at 24 and internally threaded to fit the screw-threads on the outside of the head of the screw 17.

The cable is held upon the wall by the clamp in the usual manner. It contains a plurality of wires, enough for the service for which it is desired. But if the service increases so that more wires are needed, they may be added as needed, by simply adding the bridle rings which may be readily affixed to the member which fastens the clamp to the wall. This overcomes the principal difficulty of such devices as have heretofore been used in which the bridle-rings were screwed into the metal of the clamp itself which does not afford a sufficient hold for the ring and in which the threaded holes ofeen become so corroded or otherwise injured as to be useless.

Several modifications of this device are illustrated and described to show that I do not limit myself to any specific form of construction.

What I claim is:

1. A cable clamp, a member for affixing said clamp to a desired structure, said member being provided with two sets of screw-threads of different diameters in axial alinement with each other, and an auxiliary holding device threaded to fit the screw threads on said member.

2. A hanger for supporting a cable against a desired structure, comprising a bent portion adapted to partially encircle the cable, a portion providing a surface adapted to lie against said structure, and provided with an opening, an externally threaded screw adapted to pass through said opening into the structure and having a head provided with screw threads of different diameter than those of the screw and a bridle-ring having a threaded portion adapted to fit said threaded head.

3. A hanger for supporting a cable against a desired structure, comprising a bent portion adapted to partially encircle the cable, a portion providing a surface adapted to lie against said structure, and provided with an opening, an externally threaded screw adapted to pass through said opening into the structure and having a head provided with an internally threaded axially disposed hole of smaller diameter than that of the screw, and a bridle-ring having an externally threaded shank adapted to fit said threaded hole.

In witness whereof, I have hereunto set my hand this 12 day of Sept. in the year 1912.

ERNEST W. MARSHALL.

Witnesses:
F. B. GRAVES,
G. R. QUIMBY.